US005657902A

United States Patent [19]
Kraus

[11] Patent Number: 5,657,902
[45] Date of Patent: Aug. 19, 1997

[54] VIBRATORY FEEDER FOR GRANULAR MATERIALS

[75] Inventor: Richard B. Kraus, Barrington, Ill.

[73] Assignee: General Kinematics Corporation, Barrington, Ill.

[21] Appl. No.: 587,510

[22] Filed: Jan. 17, 1996

[51] Int. Cl.⁶ ............................................. B67D 5/08
[52] U.S. Cl. ...................... 222/56; 222/152; 222/195; 222/196; 198/532
[58] Field of Search ................. 222/56, 152, 181.1, 222/195, 196, 200; 198/532, 533, 534

[56] References Cited

U.S. PATENT DOCUMENTS

| | | | |
|---|---|---|---|
| 2,446,752 | 8/1948 | Fiddyment | 198/533 |
| 2,610,726 | 9/1952 | Howard | 222/200 X |
| 2,638,248 | 5/1953 | Alvord | 222/56 |
| 3,091,368 | 5/1963 | Harley et al. | 222/56 |
| 3,225,963 | 12/1965 | Arpajian | 222/195 X |
| 4,415,444 | 11/1983 | Guptail | |
| 4,620,586 | 11/1986 | Musschoot | |
| 5,285,930 | 2/1994 | Nielsen | 222/56 X |
| 5,354,038 | 10/1994 | Crafton | |

FOREIGN PATENT DOCUMENTS

| | | | |
|---|---|---|---|
| 1346152 | 1/1963 | France | 222/196 |
| 55-22178 | 2/1990 | Japan | 222/196 |
| 581036 | 11/1977 | U.S.S.R. | 222/196 |
| 631415 | 11/1978 | U.S.S.R. | 222/56 |
| 797867 | 1/1981 | U.S.S.R. | 222/196 |

OTHER PUBLICATIONS

Copy of Brochure on C.E.E. Sandlion System 1993.

*Primary Examiner*—Andres Kashnikow
*Assistant Examiner*—Kenneth Bomberg
*Attorney, Agent, or Firm*—Marshall, O'Toole, Gerstein, Murray & Borun

[57] ABSTRACT

In order to convey granular material from an upstream processing location, a vibratory feeder includes a conveyor having an inlet end and an outlet end disposed in spaced apart relation. The conveyor has the inlet end disposed in a position to receive the material from an outlet of a source of the material by way of gravity. The vibratory feeder utilizes an unbalanced motor for vibrating the conveyor to apply a vibratory force causing the material to be conveyed from the inlet end to the outlet end thereof. The transfer of the material from the source to the conveyor is controlled by using a receptacle have a valve for dispensing the material in the receptacle at the inlet end of the conveyor. Specifically, the receptacle receives the material from the source by gravity and the valve opens and closes dependent upon accumulation of the material in the receptacle.

20 Claims, 2 Drawing Sheets

VIBRATORY FEEDER FOR GRANULAR MATERIALS

FIELD OF THE INVENTION

The present invention is generally related to vibratory feeders and, more particularly, a vibratory feeder for conveying a granular material or the like.

BACKGROUND OF THE INVENTION

As is well known in the art, vibratory processing equipment has been developed to satisfy a wide range of diverse applications. It is oftentimes the case that a system for handling any of a variety of different granular materials will include as an integral component a vibratory feeder for conveying the granular material from a processing point to a post-processing location. At the processing point, there may be a need for controlling the transfer of the granular material from the processor to a conveyor.

In one particular application, a vibratory feeder is required for conveying the sand that is reclaimed in a foundry operation. The sand is typically bonded by a resin to form a sand mold and, after a casting has been formed, the sand mold may be passed over a machine called a shake-out, usually of a vibratory nature, where the sand is shaken loose from the casting. Optionally, the sand mold may be subjected to hot air to cause the resin to break down so that the sand will fall away from the casting.

In either case, the sand will typically be collected in the bottom of a chamber for further processing. The sand so collected may have chunks still bound by the resin in addition to sand grains where the resin has been removed. In the bottom of the chamber, the remainder of the resin may be removed from the sand by utilizing a static fluidizing bed.

More specifically, the chamber may have a negative pressure and the fluidizing bed may be created by introducing hot air. The hot air will fluidize the sand and cause the remaining resin to evaporate from the sand in order to fully reclaim the sand for further use. When the sand reaches a preselected level in the bottom of the chamber, it may be removed by passing through a discharge assembly.

Once the sand passes through the discharge assembly, there is a need to convey the sand to a post-processing location. It is important that the sand be conveyed in a manner that does not interfere with the sand reclamation operation or the functioning of the equipment used in this operation. Moveover, the conveying of the sand must be complementary to the functioning of the sand reclamation equipment.

While the requirements that are inherent in sand reclamation have been described in some detail, it will be appreciated that there are many other granular material processing operations that have similar requirements. It is well known in the vibratory equipment field that many granular materials (which, for purposes of this invention, shall also be understood to include powders) must be conveyed from a processing point to a post-processing location in a manner that can be most expediently accomplished utilizing a vibratory feeder. In most if not all such applications, it is necessary or desirable for the transfer of the granular material from the processing point to the post-processing location to be accomplished in a suitably controlled manner.

The present invention is directed to overcoming one or more of the foregoing problems and achieving one or more of the resulting objects.

SUMMARY OF THE INVENTION

It is an object of the present invention to provide a vibratory feeder for a granular material including a conveyor and means for vibrating the conveyor. It is also an object of the present invention to control the transfer of the granular material from a source to the conveyor wherein the granular material is received from the source by gravity. It is a further object of the present invention to provide valve means for dispensing the granular material to the conveyor dependent upon accumulation of the granular material in a receptacle.

Accordingly, the present invention is directed to a vibratory feeder for a granular material including a conveyor, means for vibrating the conveyor, and means for controlling the transfer of the granular material. The conveyor has an inlet end and an outlet end disposed in spaced apart relation such that the inlet end is disposed in a position to receive the granular material from an outlet of a source by gravity. The controlling means controls the transfer of the granular material to the inlet end of the conveyor and the vibrating means applies a vibratory force to convey the granular material to the outlet end of the conveyor. The controlling means includes a receptacle for receiving the granular material from the source by gravity and valve means operable to dispense the granular material in the receptacle at the inlet end of the conveyor. The opening and closing of the valve means for dispensing the granular material at the inlet end of the conveyor is dependent upon the degree of accumulation of the granular material in the receptacle. With these features, the receptacle may comprise a feed tube and the valve means may comprise a pivoting plate disposed in a closed position by gravity absent the granular material in the receptacle.

In the exemplary embodiment, the receptacle and the valve means are both mounted so as to be in vibratory insolation relative to the conveyor. The conveyor may advantageously include an elongated conveying surface which extends in a longitudinal direction from the inlet end to the outlet end and the source may advantageously comprise a chamber mounted so as to be in vibratory isolation relative to the conveyor. Still additionally, the vibrating means preferably comprises an unbalanced motor operably connected to the conveyor by a flexible slat.

In one particular application, the vibratory feeder is particularly well suited for conveying sand from a vacuum chamber. The conveyor preferably has the inlet end disposed in a position below the vacuum chamber in order to receive the sand from an outlet of the vacuum chamber positioned above the conveyor. Additionally, the means for controlling the transfer of sand from the vacuum chamber to the conveyor may advantageously comprise a feed tube.

In the preferred embodiment, the valve means may comprise a pivoting plate that is associated with a lower end of the feed tube. The feed tube advantageously has an upper end opposite the pivoting plate in direct communication with the outlet of the vacuum chamber. Preferably, the vacuum chamber is rigidly mounted and the conveyor is mounted to the vacuum chamber in vibratory isolation relative thereto. In one particularly advantageous application, the present invention is directed to an apparatus for reclaiming foundry sand. The apparatus for this application includes a vacuum chamber for reclaiming the sand in a fluidized bed and a weir pipe is provided in the vacuum chamber for directing the reclaimed sand through an outlet. With this arrangement, the reclaimed sand from the fluidized bed is directed through the outlet of the weir pipe by gravity.

As for other details, the feed tube is preferably in direct communication with the outlet of the weir pipe in the vacuum chamber so as to be able to receive the reclaimed sand by gravity. It is also advantageous for a pivoting plate to be associated with a lower end of the feed tube for dispensing the reclaimed sand in the feed tube at the inlet end of the conveyor. When so constructed, the pivoting plate is preferably disposed so as to normally be in a closed position by gravity absent the accumulation of reclaimed sand in the feed tube.

Other objects, advantages and features of the present invention will become apparent from a consideration of the following specification taken in conjunction with the accompanying drawings.

DETAILED DESCRIPTION OF THE PREFERRED EMBODIMENT

Figure 1:
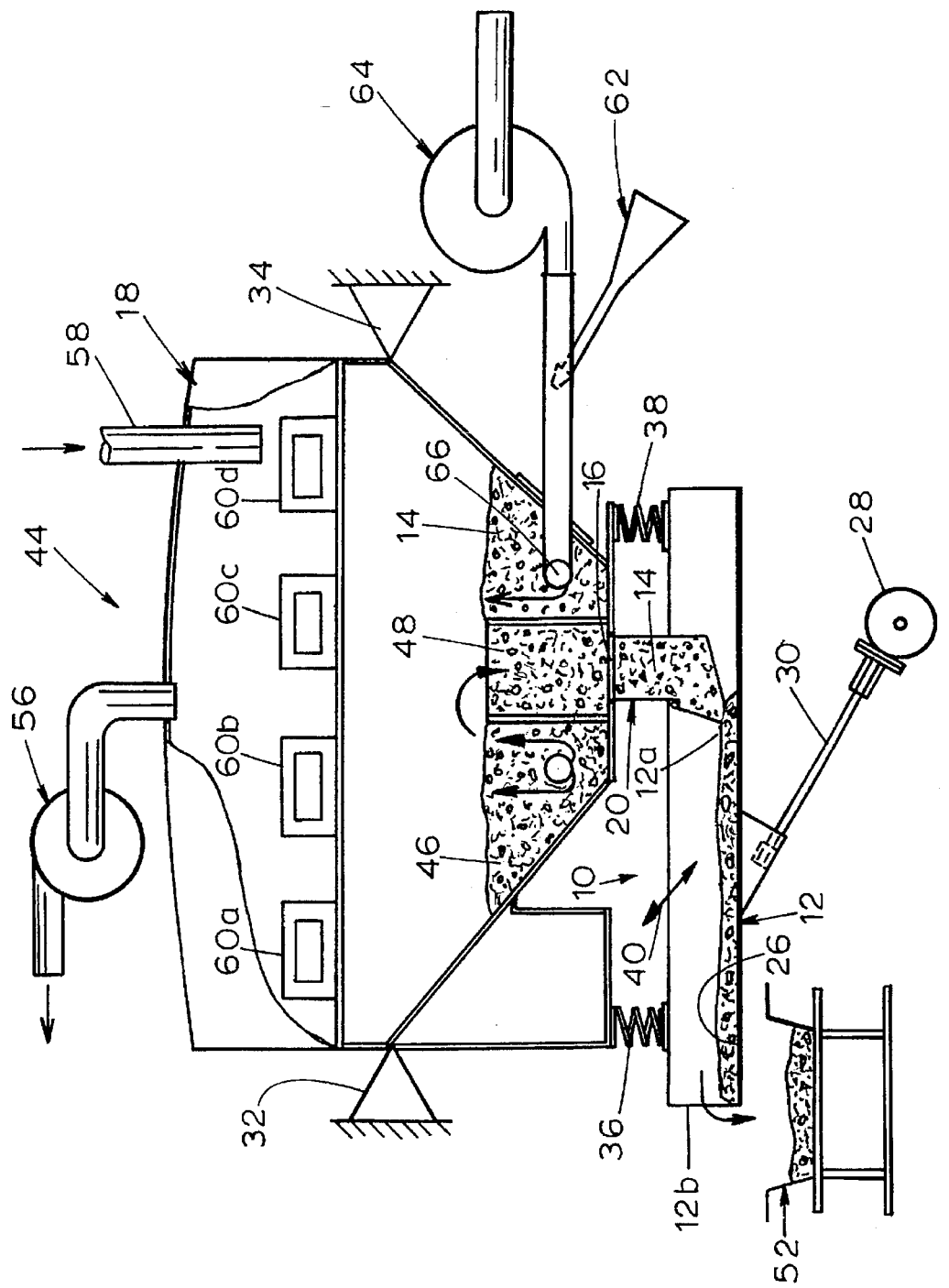
FIG. 1 is a cross-sectional view illustrating a vibratory feeder for a granular material in accordance with the present invention.

In the illustrations given, and with reference first to FIG. 1, the reference numeral 10 designates generally a vibratory feeder for a granular material in accordance with the present invention. The vibratory feeder 10 comprises a conveyor 12 having an inlet end 12a and an outlet end 12b disposed in spaced apart relation. The conveyor 12 has the inlet end 12a disposed in a position where it can receive the granular material 14 from an outlet 16 of a source of the granular material 14 (generally designated 18) by way of gravity. The vibratory feeder 10 also includes means for vibrating the conveyor 12 for applying a vibratory force to cause the granular material 14 to be conveyed from the inlet end 12a to the outlet end 12b thereof. With this arrangement, the vibratory feeder 10 also includes means for controlling the transfer of the granular material 14 from the source 18 of the granular material 14 to the conveyor 12.

More specifically, the transfer controlling means includes a receptacle 20 for receiving the granular material 14 from the source 18 by way of gravity. It also includes valve means generally designated 22 which is associated with the receptacle 20 for dispensing the granular material 14 in the receptacle 20 at the inlet end 12a of the conveyor 12 (see FIGS. 2 and 3). In this connection, it will be understood that the valve means 22 opens and closes dependent upon the degree of accumulation of the granular material 14 in the receptacle 20.

Figure 2:
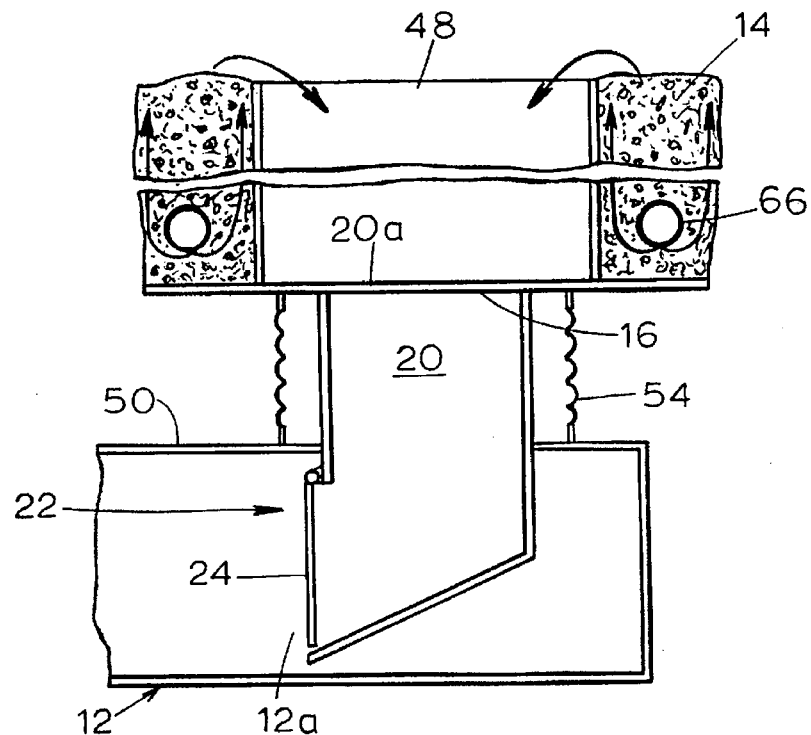
FIG. 2 is an enlarged detail view of a portion of the vibratory feeder of FIG. 1 prior to dispensing a granular material.
Figure 3:
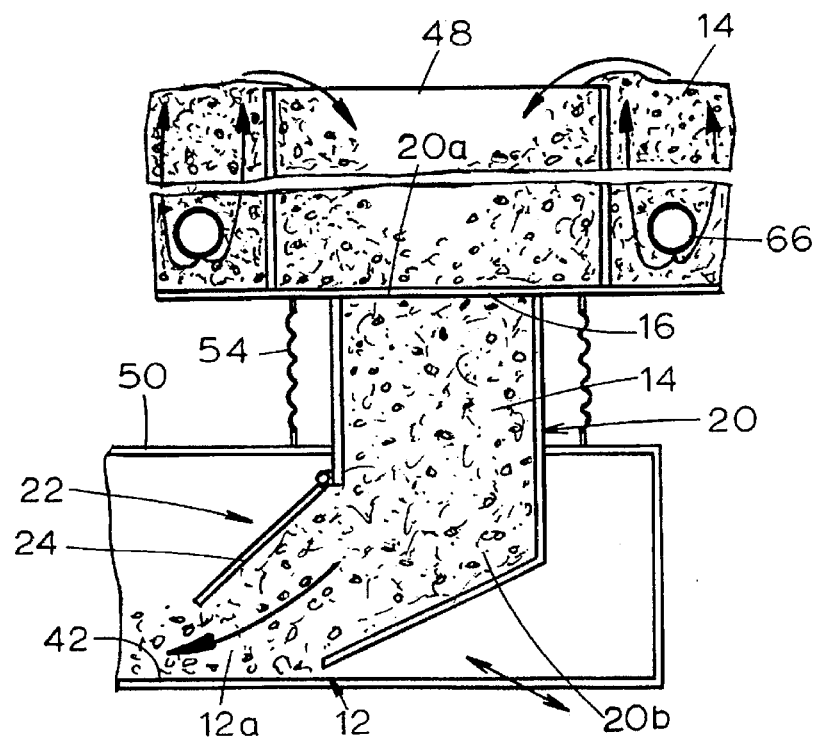
FIG. 3 is an enlarged detail view similar to FIG. 2 but illustrating a portion of the vibratory feeder dispensing a granular material.

In the embodiment illustrated in FIGS. 1 through 3, the receptacle 20 comprises a feed tube having an inlet end 20a in communication with the outlet 16 of the source 18. It will also been seen in FIGS. 2 and 3 that the valve means 22 comprises a pivoting plate 24 disposed in a closed position by gravity absent any granular material 14 in the receptacle or feed tube 20. Preferably, the receptacle or feed tube 20 and the valve means 22 in the form of the pivoting plate 24 are both mounted so as to be in vibratory isolation relative to the conveyor 12.

As will be appreciated from FIG. 1, the conveyor 12 includes an elongated conveying surface 26 extending in a longitudinal direction from the inlet end 12a to the outlet end 12b. It will also be appreciated from FIG. 1 that the source 18 advantageously comprises a chamber which is mounted so as to be in vibratory isolation relative to the conveyor 12. Preferably, the means for vibrating the conveyor 12 may take the form of an unbalanced motor 28 which is operably interconnected to the conveyor 12 by means of a flexible slat 30.

In one advantageous application, the vibratory feeder 10 is particularly well suited for conveying a granular material 14 in the form of sand from a processing point to a post-processing location. The source 18 of sand 14 in this application may, for example, comprise a vacuum chamber in which case the conveyor 12 may have its inlet end 12a disposed in a position below the outlet of the vacuum chamber 18 to receive the sand 14 from the vacuum chamber 18 by way of gravity. Also, and as previously suggested, the pivoting plate 24 is associated with a lower end 20b of the feed tube 20 to open in response to an accumulation of the sand 14 in the feed tube 20.

Referring once again to FIGS. 2 and 3, the feed tube 20 has its upper or inlet end 20a opposite and vertically spaced from the pivoting plate 24 so as to be in direct communication with the outlet 16 of the vacuum chamber 18. It will be appreciated from FIG. 2 that the pivoting plate 24 is normally disposed in a closed position by gravity absent sand 14 in the feed tube 20, but the pivoting plate 24 opens in response to an accumulation of the sand 14 in the feed tube 20 as shown in FIG. 3. As also previously indicated, FIGS. 1 through 3 clearly illustrate that the feed tube 20 and the pivoting plate 24 are both mounted in such a manner as to be in vibratory isolation relative to the conveyor 12.

In this connection, the vacuum chamber 18 is rigidly mounted, by way of example, as at 32 and 34 which have been shown schematically for illustration purposes only. It will be appreciated that the vacuum chamber 18 can be rigidly mounted at any of a variety of locations in any conventional manner so long as the mounting points do not interfere with the operation of the vibratory feeder. By utilizing the springs as at 36 and 38, the conveyor 12 can be mounted to the rigidly mounted vacuum chamber 18 in vibratory isolation relative thereto.

In other words, the unbalanced motor 28 can be operated to impart a vibratory force to the conveyor 12 through the flexible slat 30. The vibratory force imparted to the conveyor 12 will act generally along the force line 40 to cause the sand to have both a vertical and horizontal force component whereby it is moved from the inlet 12a to the outlet end 12b of the conveyor 12. However, due to the isolation springs 36 and 38, the vibratory force is not imparted to the vacuum chamber 18 comprising the source of the sand 14.

As will be appreciated by referring to FIGS. 2 and 3, the feed tube 20 and the pivoting plate 24 are also isolated from direct exposure to the vibratory force that is imparted to the conveyor 12. It will be seen that there is no direct contact between the conveyor 12 and the feed tube 20 and pivoting plate 24 inasmuch as the latter two components are directly secured to the rigidly mounted vacuum chamber 18 which, as previously described, is in vibratory isolation relative to the conveyor 12. However, since the sand exiting at the lower end 20b of the feed tube 20 is in contact with the conveyor 12 as at 42, there will be vibratory forces imparted to the sand 14.

While some of this vibratory force generated by the unbalanced motor 28 and the flexible slat 30 will be necessarily be imparted to the feed tube 20 and the pivoting plate 24, it will not be significant. However, the vibratory force will act on the sand 14 in an upstream direction toward the inlet end 20a of the feed tube 20 to facilitate the feeding of the sand 14 under the pivoting plate 24 to the conveyor 12.

In other words, the vibratory force causes the sand 14 in the feed tube 20 to work its way in a vertically downward direction from the inlet end 20a toward the lower or outlet end 20b of the feed tube 20 onto the conveyor surface 26 to be conveyed from the inlet end 12a to the outlet end 12b of the conveyor 12.

Referring specifically to FIG. 1, the composite apparatus which has been generally designated 44 is adapted to reclaim foundry sand 14 which has been processed in a fluidized bed as at 46. The vacuum chamber 18 will be seen to have a vertically upwardly extending weir pipe 48 through which reclaimed sand from the fluidized bed 46 overflows to pass through the outlet 16. With this arrangement, the inlet end 12a of the conveyor 12 is disposed below the outlet 16 of the vacuum chamber 18 to receive reclaimed sand 14 from the fluidized bed 46 passing through the weir pipe 48.

As will be clear from FIGS. 2 and 3, the feed tube 20 in the foundry sand reclamation application is in direct communication with the outlet 16 in the vacuum chamber 18 at the lower end of the weir pipe 48. It will be seen that the lower end of the weir pipe 48 is immediately adjacent the inlet end 20a of the feed tube 20. In other words, the feed tube 20 has its upper end 20a in direct communication with the lower end of the weir pipe 48 that comprises the outlet 16 of the vacuum chamber 18.

As for other details of the present invention, the conveyor 12 may comprise a closed tubular structure 50 for conveying the sand 14 from the inlet end 12a to the outlet end 12b where it is dispensed to an open conveyor 52. The closed tubular structure 50 preferably has an enlarged opening 50a through which the feed tube 20 extends, but in radially inwardly spaced relation thereto, to maintain vibratory isolation between the feed tube 20 and the conveyor 12. In addition, a flexible seal 54 may be provided that extends from the enlarged opening 50a to the bottom of the vacuum chamber 18 in order to maintain the closed nature of the closed tubular structure 50 from the inlet end 12a to the outlet end 12b of the conveyor 12.

While not forming a part of the present invention, the vacuum chamber 18 may include an exhaust blower 56 for creating the vacuum within the vacuum chamber 18. It may also include a sand feed tube 58 for feeding sand for processing in the fluidized bed 46, stations 60a, 60b, 60c, and 60d which may either serve as a shake out for sand molds or as stations for heat treating sand molds to break down the resin for further treatment of the sand within the fluidized bed 46, and a gas burner 62 and blower 64 that acts through a circumferential fluidizing pipe 66 to introduce hot air to the fluidized bed 46. Also, and while not shown, the weir pipe 48 may be provided with one or more flapper valves to assist in maintaining a negative pressure within the vacuum chamber 18.

With the present invention, the vibratory feeder 10 is well suite for use with a vacuum chamber 18 to process material in the form of sand 14. It may accomplish this by utilizing a fluidized bed 46 of sand 14 and, as the level rises in the vacuum chamber 18, the sand 14 may spill over into the vertical weir pipe 48 and into the feed tube 20 and then to the conveyor 12. Normally, absent sand in the feed tube 20, the negative pressure in the vacuum chamber 18 causes the pivoting plate 24 to be in a closed position.

Generally speaking, the pivoting plate 24 is held in a closed position until a sufficient accumulation of sand 14 is in the feed tube 20. The pressure of the sand 14 in the feed tube 20 then causes the pivoting plate 24 to open and, due to the presence of the sand 14 within the feed tube 20, the negative pressure within the vacuum chamber 18 is maintained. At the same time, the conveyor 12 conveys the sand 14 from the inlet end 12a to the outlet end 12b to be deposited onto the conveyor 52.

In this connection, the conveying of the sand 14 will continue until the level of sand 14 drops to a point below the top of the weir pipe 48 where it will no longer spill over to pass into the feed tube 20. The sand 14 in the vacuum chamber 18 may be fluidized by the incoming process gas which is provided by the gas burner 62 and the blower 64 relatively continuously. When the sand 14 in the fluidized 46 again fills to the top of the weir pipe 48, the sand 14 again spills over to pass into the feed tube 20 to be conveyed away by means of the conveyor 12.

While the invention as been described in connection with the processing of foundry sand, it will be appreciated that it is well suited for handling any of wide variety of granular materials and powders. It is particularly suited for any application in which a vibratory feeder may be implemented to convey a granular material or powder from an inlet where it is received by gravity in vibratory isolation from upstream processing to an outlet which is spaced therefrom. For this reason, the foundry sand reclamation application has been presented merely for purposes of understanding one among many particularly advantageous uses of the present invention.

While in the foregoing there has been set forth a preferred embodiment of the invention, it will be appreciated that the details herein given may be varied by those skilled in the art without departing from the true spirit and scope of the appended claims.

I claim:

1. A vibratory feeder for a granular material, comprising:
   a conveyor having an inlet end and an outlet end disposed in spaced apart relation, said conveyor having said inlet end disposed in a position to receive said granular material from an outlet of a source of said granular material, said conveyor adapted to receive said granular material from said source of said granular material by gravity;
   means for vibrating said conveyor for applying a vibratory force for causing said granular material to be conveyed from said inlet end to said outlet end thereof; and
   means for controlling a transfer of said granular material from said source to said conveyor, said transfer controlling means including a receptacle for receiving said granular material from said source by gravity and a valve means associated with said receptacle for dispensing said granular material in said receptacle at said inlet end of said conveyor, said valve means opening and closing dependent upon an accumulation of said granular material in said receptacle.

2. The vibratory feeder of claim 1 wherein said receptacle comprises a feed tube having an inlet end adapted to communicate with said outlet of said source.

3. The vibratory feeder of claim 1 wherein said valve means comprises a pivoting plate disposed in a closed position by gravity absent said granular material in said receptacle.

4. The vibratory feeder of claim 1 further including said source, wherein said receptacle and said valve means are both mounted so as to be in vibratory isolation relative to said conveyor.

5. The vibratory feeder of claim 1 wherein said conveyor includes an elongated conveying surface extending in a longitudinal direction from said inlet end to said outlet end.

6. The vibratory feeder of claim 1 further including said source, wherein said source comprises a chamber and said chamber is mounted so as to be in vibratory isolation relative to said conveyor.

7. The vibratory feeder of claim 1 wherein said conveyor vibrating means comprises an unbalanced motor operably connected to said conveyor by a flexible slat.

8. A vibratory feeder for conveying sand from a vacuum chamber, comprising:

a conveyor having an inlet end and an outlet end disposed in spaced apart relation, said conveyor having said inlet end adapted to be disposed in a position below said vacuum chamber for receiving said sand from an outlet of said vacuum chamber, said conveyor adapted to receive said sand from said vacuum chamber by gravity;

means for vibrating said conveyor for applying a vibratory force for causing said sand from said vacuum chamber to be conveyed from said inlet end to said outlet end thereof; and means for controlling a transfer of said sand from said vacuum chamber to said conveyor, said transfer controlling means including a feed tube for receiving said sand from said vacuum chamber by gravity and a pivoting plate associated with a lower end of said feed tube for dispensing said sand in said feed tube at said inlet end of said conveyor, said pivoting plate opening in response to an accumulation of said sand in said feed tube.

9. The vibratory feeder of claim 8 wherein said feed tube has an upper end opposite said pivoting plate adapted to communicate with said outlet of said vacuum chamber.

10. The vibratory feeder of claim 8 wherein said pivoting plate is normally disposed in a closed position by gravity absent said sand in said feed tube.

11. The vibratory feeder of claim 8 wherein said feed tube and said pivoting plate are both mounted so as to be in vibratory isolation relative to said conveyor.

12. The vibratory feeder of claim 8 wherein said conveyor includes an elongated conveying surface extending in a longitudinal direction from said inlet end to said outlet end.

13. The vibratory feeder of claim 8 further including said vacuum chamber, wherein said vacuum chamber is rigidly mounted and said conveyor is mounted to said vacuum chamber in vibratory isolation relative thereto.

14. The vibratory feeder of claim 8 wherein said conveyor vibrating means comprises an unbalanced motor operably connected to said conveyor by a flexible slat.

15. In an apparatus for reclaiming foundry sand including a vacuum chamber, said vacuum chamber adapted to reclaim said sand in a fluidized bed, said vacuum chamber having a weir pipe for directing said reclaimed sand through an outlet, the improvement comprising:

a conveyor having an inlet end and an outlet end disposed in spaced apart relation, said conveyor having said inlet end disposed in a position below said outlet of said vacuum chamber to receive said reclaimed sand directed through said outlet by said weir pipe, said conveyor adapted to receive said reclaimed sand from said vacuum chamber by gravity;

means for vibrating said conveyor for applying a vibratory force causing said reclaimed sand from said vacuum chamber to be conveyed from said inlet end to said outlet end thereof; and means for controlling a transfer of said sand from said vacuum chamber to said conveyor, said transfer controlling means including a feed tube in communication with said weir pipe and said outlet of said vacuum chamber for receiving said reclaimed sand from said vacuum chamber by gravity and a pivoting plate associated with a lower end of said feed tube for dispensing said reclaimed sand in said feed tube at said inlet end of said conveyor, said pivoting plate opening in response to an accumulation of said reclaimed sand in said feed tube;

said feed tube having an upper end opposite said pivoting plate in communication with said weir pipe and said outlet of said vacuum chamber, said pivoting plate normally being disposed in a closed position by gravity absent said accumulation of said reclaimed sand in said feed tube.

16. The vibratory feeder of claim 15 wherein said feed tube and said pivoting plate are both mounted so as to be in vibratory isolation relative to said conveyor.

17. The vibratory feeder of claim 15 wherein said conveyor includes an elongated conveying surface extending in a longitudinal direction from said inlet end to said outlet end.

18. The vibratory feeder of claim 15 wherein said vacuum chamber is rigidly mounted and said conveyor is mounted to said vacuum chamber in vibratory isolation relative thereto.

19. The vibratory feeder of claim 15 wherein said conveyor vibrating means comprises an unbalanced motor operably connected to said conveyor by a flexible slat.

20. The vibratory feeder of claim 15 including a pair of isolation springs mounting said conveyor to said vacuum chamber at each of said inlet and outlet ends of said conveyor.

* * * * *

UNITED STATES PATENT AND TRADEMARK OFFICE
CERTIFICATE OF CORRECTION

PATENT NO. : 5,657,902

DATED : August 19, 1997

INVENTOR(S) : Richard B. Kraus

It is certified that error appears in the above-identified patent and that said Letters Patent is hereby corrected as shown below:

column 5, line 58, please delete "suite" and insert in its place --suited--;

column 6, line 18, please delete "as" and insert in its place --has--; and column 6, lines 64-65, please delete "further including said source".

Signed and Sealed this

Thirteenth Day of January, 1998

Attest:

BRUCE LEHMAN

Attesting Officer

Commissioner of Patents and Trademarks